United States Patent Office 3,157,590
Patented Nov. 17, 1964

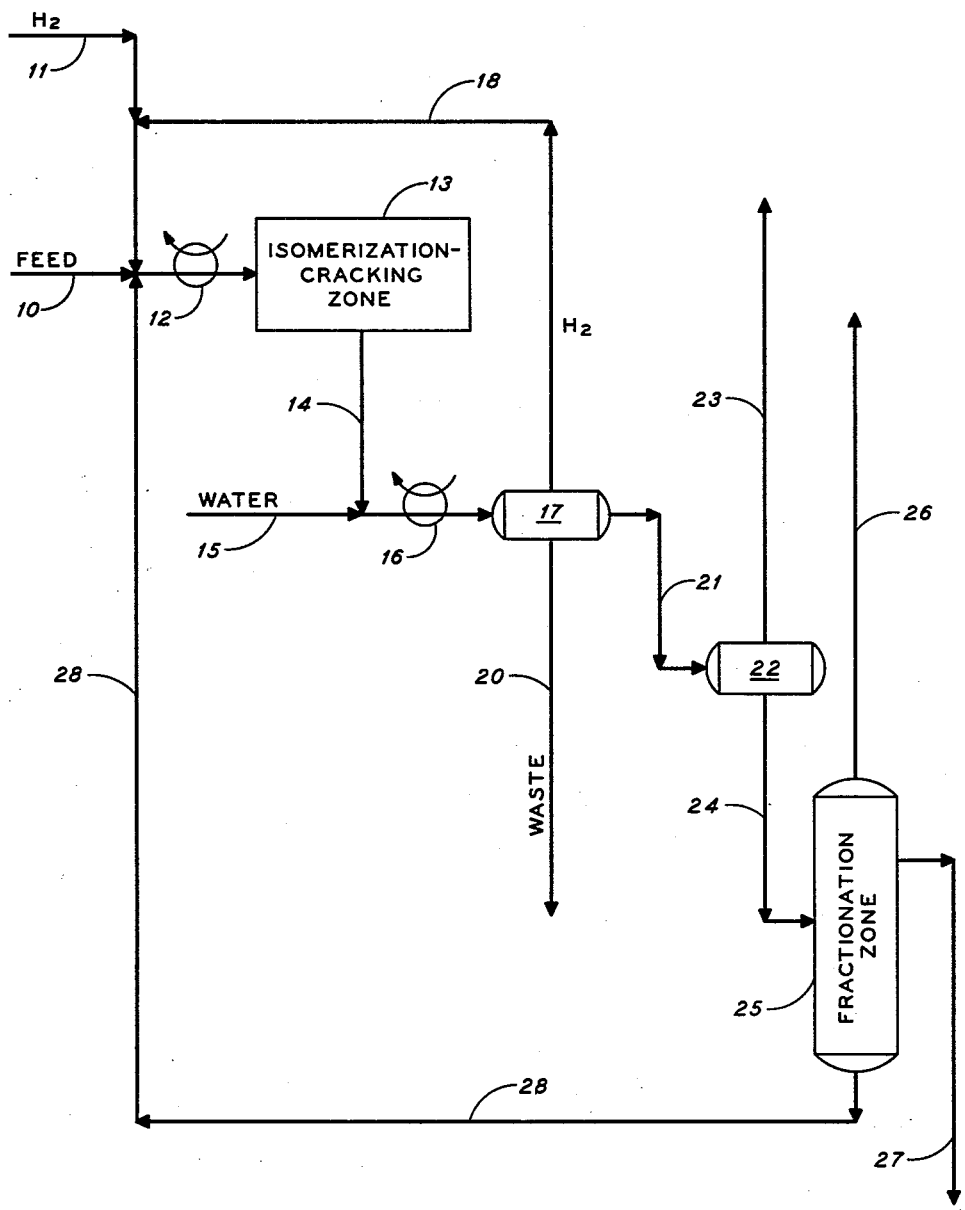

3,157,590
HYDROCARBON CONVERSION PROCESS WITH A NITROGEN CONTAINING DISTILLATE FEED STOCK
John W. Scott, Jr., Ross, Calif., Lyman S. Stanton, Bountiful, Utah, and Harold F. Mason, Berkeley, Calif., assignors to California Research Corporation, San Francisco, Calif., a corporation of Delaware
Filed May 11, 1962, Ser. No. 199,552
3 Claims. (Cl. 208—111)

This invention relates to a catalytic process for upgrading petroleum distillates into gasolines of high quality, and it is particularly directed to a method for increasing the activity of a catalyst embodying a hydrogenating-dehydrogenating component deposited on an active cracking support, when employed in the conversion of nitrogen-containing stocks to gasoline.

This application is a continuation-in-part of our application Serial No. 542,156, filed October 24, 1955, and now abandoned.

In the catalytic conversion process to which the present invention relates, a petroleum distillate such as a naphtha, gas oil, or catalytic cycle oil, along with added hydrogen, is passed at temperatures between about 500° to 850° F., and pressures of from about 600 to 3000 p.s.i.g., through an isomerization-cracking zone containing a catalyst comprised of a hydrogenating-dehydrogenating component disposed on an active cracking support. The effluent from this reaction zone is then freed of a hydrogen-rich recycle stream which is then returned, along with make-up hydrogen, to replace that consumed during the reaction, to the isomerization-cracking zone. The remaining portion of the effluent (after being passed through a second, low-pressure gas-liquid separator to partially separate H$_2$S and other normally gaseous products) is then fractionated to one or more gasoline fractions, while the bottoms (normally comprising materials boiling above about 300° F.) are returned to the isomerization-cracking zone along with fresh feed. Preferably, the last-mentioned fractionating is so conducted as to recover an intermediate gasoline fraction which is then passed, along with added hydrogen, through a platinum or other reforming catalyst in a reforming zone at temperatures between 800° and 1000° F. and pressures of from 200 to 900 p.s.i.g. The hydrogen produced in the reforming zone is recovered from the reactor effluent from that zone and returned to the isomerization-cracking zone, it making up a significant part of the hydrogen consumption which occurs in the latter zone. This process is similar to that described in John W. Scott, Jr. U. S. Patent 2,944,006, issued July 5, 1960.

In such a process, it will be noted that the fresh feed stream to the isomerization-cracking zone should be low in nitrogen compounds if poisoning of the catalyst, as evidenced by reduced conversion of total feed thereto (including fresh and recycle feeds) is to be avoided. Thus, while per-pass conversions on the order of 50 to 60% can be obtained with fresh catalyst at temperatures of about 750° F. with feeds containing less than about 10 p.p.m. of nitrogen, the conversion falls to a range of about 20 to 30% with feeds containing 100 to 200 p.p.m. nitrogen. Obviously, it would be desirable if a method were available for effecting an appreciable increase in said catalyst activity levels even when feeding stocks containing relatively small amounts of nitrogen, compounds, e.g., 100 to as much as 500 p.p.m. nitrogen, or even more.

The present invention is based on the discovery that greatly improved catalyst activity and per-pass conversion in the isomerization-cracking zone can be obtained even with feed streams containing as much as 500 p.p.m.

nitrogen by so modifying the process that the gaseous recycle stream supplied to the isomerization-cracking zone is substantially free of ammonia. This can be effected either by treating the whole effluent from this zone or by treating only the hydrogen-rich gaseous stream itself. In case the whole effluent is to be treated, the desired result can be obtained by mixing the same with water which is then separated from the product, along with the ammonia present in the effluent, in a gas-liquid separator from which the hydrogen-rich recycle stream is recovered overhead. In the other alternative (which may, if desired, be practiced in conjunction with the effluent treating method) the gaseous recycle stream is subjected to a water or acid scrubbing treatment to remove the ammonia.

The improvement in relative catalyst activity which can be obtained by a practice of the present invention is illustrated by the data presented in Table I below, which illustrates operation of the process of the present invention when hydrocracking catalytic cycle oils of varying nitrogen content with a representative catalyst comprising 0.3% platinum deposited on a silica-alumina support. In each case, the hydrocracking conditions are 1200 p.s.i.g., 775° F. and liquid hourly space velocity (including recycle feed) of 2. The proportion of recycle feed (which is inherently of much reduced nitrogen content) to fresh feed increases in inverse proportion to the conversion rate.

TABLE I

| Nitrogen Content of Fresh Catalytic Cycle Oil Feed (p.p.m. N) | Increase in Per Pass Conversion Due to Application of Present Invention, percent | Approximate Total Conversion, percent |
|---|---|---|
| 3 | 15 | 50–60 |
| 14 | 28 | 40–50 |
| 50 | 60 | 40 |
| 100 | 53 | 30–40 |
| 200 | 28 | 20–30 |
| 400 | 17 | 20 |

It will be observed from the above table that the increase in catalyst activity is still significant even with feeds containing as much as 400 p.p.m. or more of nitrogen. However, the net conversion with such feeds, even with this increase, is relatively low, generally of the order of 20 to 25%. Accordingly, this invention is preferably employed with feed streams containing less than about 200 p.p.m. nitrogen in order to obtain net conversions in excess of 30% over long periods of time.

As stated above, the present invention is adapted to be employed in the conversion to premium gasolines of nitrogen-containing petroleum distillates. Representative starting materials from which high octane gasolines can be obtained in good yield include petroleum naphthas of straight run, catalytic or thermal cracked origin, and boiling in the range of from about 175° to 500° F., cycle oils from thermal or catalytic cracking units, including light stocks boiling between about 380° and 700° F. as well as heavy cycle oils boiling between about 550° and 750° F., and gas oils boiling within the range from about 400° to about 750° F., together with mixtures of one or more of the foregoing stocks or fractions thereof. While the invention can be practiced with utility in connection with petroleum distillates containing as much as 400 to 500 p.p.m. of nitrogen or even more, the operation becomes much more economical with stocks containing 200 p.p.m. or less of nitrogen and such stocks are therefore preferred. A still more preferred feed stock is one containing from about 3 to 100 p.p.m. of nitrogen since the present invention affords optimum benefits with such stocks. In the case of stocks which are not already sufficiently low in nitrogen, acceptable levels can be reached by pretreating the feed material with hydrogen in the presence of a suitable catalyst at elevated temperatures and pressures. Such suitable catalysts include such conventional catalysts as cobalt and/or nickel with molybdenum and/or tungsten on a refractory support such as alumina. A representative catalyst for this purpose is one wherein a coprecipitated molybdena-alumina material (e.g., one prepared in accordance with the disclosure of U.S. Patent No. 2,432,286 to Claussen et al. or No. 2,697,066 to Sieg) is combined with cobalt oxide, the final catalyst having a metals content equivalent to about 2% cobalt and 7% molybdenum. Representative processing conditions for removing nitrogen with this catalyst are an LHSV of 0.5 to 3.0, 600° to 800° F., 200 to 2000 p.s.i.g. and 1000 to 15,000 s.c.f. of hydrogen per barrel of feed stock. The effluent from this pretreating, or hydrofining, step can either be fed directly to the isomerization-cracking zone, or it can be first subjected to a preliminary fractionation to remove the small amounts of low octane gasoline components which are formed during more vigorous denitrogenation treatments.

The catalyst employed in the isomerization-cracking zone is one wherein a material having hydrogenating-dehydrogenating activity is deposited or otherwise disposed on an active cracking support. The cracking component may comprise any one or more of such strongly acidic solid materials as silica-alumina, silica-magnesia, silica-alumina-zirconia composites, boria-alumina, as well as various acid-treated clays and similar materials. The hydrogenating-dehydrogenating components of the catalyst can be selected from any one or more of the various Group VI and Group VIII metals, as well as the oxides and sulfides thereof, representative materials being the oxides and sulfides of molybdenum, tungsten, vanadium, chromium and the like, as well as metals such as iron, nickel, cobalt, and platinum and various oxides thereof. If desired, more than one hydrogenating-dehydrogenating component can be present, and good results have been obtained with catalysts containing composites of two or more of the oxides of molybdenum, cobalt, chromium and zinc, and with mixtures of said oxides with fluorine. The amount of the hydrogenating-dehydrogenating component present can be varied within relatively wide limits of from about 0.1 to 15%, based on the weight of the entire catalyst. However, the amount of this material should be sufficient to give the catalyst a mild hydrogenating activity such that the catalyst is capable of promoting hydrocracking of the alkyl side chains from aromatic nuclei, but insufficient to promote substantial ring hydrogenation under the reaction conditions employed in the isomerization-cracking zone. Particularly good results have been obtained with catalysts wherein from 0.1 to 1.0% platinum, or from 1 to 12% molybdenum oxide, or from 1 to 15% cobalt or nickel, or a mixture of from 1 to 12% molybdenum oxide and from 0.1 to 5% cobalt oxide, is deposited on an active cracking support made up of silica-alumina. Thus, the molybdenum oxide-cobalt oxide catalyst can readily be prepared by soaking the beads in a solution of ammonium molybdate, drying the catalyst for 24 hours at 220° F., and then calcining the dried material for 10 hours at 1000° F. Thereafter, any cobalt employed can be introduced in a similar way, whereupon the catalyst is dried and given a last calcining step. Under favorable operating conditions, the isomerization-cracking catalyst will maintain high activity over periods of 100 to 300 or more hours. Catalyst activity can then be restored by a conventional regeneration treatment involving burning off catalyst contaminants with an oxygen-containing gas.

While the invention will be described more particularly below in connection with the method of fixed catalyst bed operation wherein the catalyst is periodically regenerated in situ, the process is also well adapted to be carried out in a moving catalyst bed system or in one of the fluidized catalyst type. In the latter methods of operation (wherein the general procedures to be employed are now well established in the art) separate vessels are employed for the respective reaction and regeneration zones. However, since in carrying out the process of this invention the catalyst retains its activity over relatively long periods of time, it is normally preferable, from an economic standpoint, to employ the fixed catalyst bed method of operation or some modification thereof.

Having selected or prepared the feed stock to be employed as well as the catalyst, the present process is effected by passing the feed, along with a gas containing at least about 1500, and preferably 3000 to 30,000, standard cubic feet (s.c.f.) of hydrogen per barrel of feed, through the catalyst in the isomerization-cracking zone at an LHSV (liquid hourly space velocity) of from about 0.3 to 5., a temperature of from about 500° to 850° F., and a pressure of at least about 600, and preferably 1000 to 3000, p.s.i.g. Preferably, the temperature in this reaction zone is maintained in the range of from about 600° to 800° F., it having been found that as reaction temperatures much below about 600° F. are employed in the isomerization-cracking zone, the per-pass conversions in said zone decrease to an unduly low level. Further, use of such low temperatures adversely affects the octane rating of the product from this zone boiling above about 200° F. due to the tendency for saturation of aromatics, and while this loss in octane values can be made up as the feed is passed through a subsequent reforming zone, such restoration is accomplished only at the expense of additional stock losses. On the other hand, as temperatures materially above about 800° F. are employed, the amount of product lost to the less desirable $C_3$ and lighter materials rapidly increases, thus lowering the gasoline yield. For example, it has been found that the amount of methane produced at 800° F., per unit of converted product, is approximately 16 times as great as that formed at 700° F., and 4 times as great as that formed at 750° F. At higher temperatures the situation becomes much worse. Accordingly, resort is normally had to such temperatures (above about 800° F.) only in the last stages of the catalyst on-stream period when it is desired to maintain relatively high activity even at the expense of higher light gas losses. Further, it should also be noted that operation at temperatures above about 850° F. induces a relatively rapid decrease in the activity of the catalyst as reflected by reduced per-pass conversion levels. Thus, when operating at 875° F. regeneration of the catalyst is required in most instances after on-stream periods of one day or less, which contrasts with on-stream periods of 100 to 300 or more hours at good activity as temperatures are maintained below 850° F.

When the ammonia in the recycle gas is to be removed by treatment of the whole effluent from the isomerization-cracking zone, said effluent is admixed with an amount of water sufficient to dissolve the ammonia readily. Good results in this respect are normally obtained by injecting from about 1 to 50 lbs. of water per barrel of said effluent, calculated as liquid, the amount employed being generally related to the amount of nitrogen present in the total feed to the isomerization-cracking zone. Thus, approximately 10 lbs. of water per barrel of feed can be employed with good effect in the case of (total) feeds containing from about 15 to 25 p.p.m. of nitrogen. For most applications, a preferred range is from about 5 to 20 lbs. of water per barrel of total feed. The term "water" as here employed includes both fresh water as well as acidified water streams, the latter having a relatively greater capacity for removing nitrogen-containing materials from the hydrocarbon phase. The resulting water-effluent mixture is then cooled and passed into a high pressure gas-liquid separator from which a hydrogen-rich recycle stream, free of ammonia, is withdrawn overhead for return to the reaction zone, along with additional hydrogen, while the water containing dissolved ammonia is withdrawn as bottoms. This additional hydrogen is generally supplied in an amount of from about 1000 to 2000 s.c.f. per barrel of fresh feed, this being the amount normally consumed during the reaction which takes place in the isomerization-cracking zone. The remaining hydrocarbon phase is then fractionated, preferably after being passed to a low pressure vapor-liquid separator to remove $C_4$ and normally gaseous components, including hydrogen sulfide. The remaining normally liquid product is then distilled to recover one or more product fractions, including a gasoline fraction, while a bottoms portion is returned to the isomerization-cracking zone. Preferably, the distillation is so effected as to take overhead a premium gasoline fraction having an end point of from about 160° to 200° F. (which gasoline is normally characterized by an octane rating of around 100 F–1+3 ml. TEL), while recovering an intermediate gasoline fraction having an end point of from about 300° to 400° F., which may then be sent to a catalytic reforming zone, if desired.

When separation of ammonia in the effluent stream from the isomerization-cracking zone is not effected by the addition of water, as indicated above, or acidified water, the ammonia is separated by contacting the hydrogen-rich recycle gas taken overhead from the high pressure gas-liquid separator in known fashion with water, acidified water or other acidic medium, preferably an organic or mineral acid which may be adsorbed or otherwise supported on an inert porous support, such, for example, as kiesel-guhr.

The ultimate yields of finished gasoline obtained by a practice of the present invention are extremely high and normally range from about 90 to 105 volume percent in terms of the volume of fresh feed supplied to the isomerization-cracking zone. From this it is obvious that the process is an extremely efficient one entailing little degradation of the feed to less valuable, normally gaseous components, especially when temperatures in the isomerization-cracking zone are maintained below 800° F.

The manner in which the present invention is practiced can be illustrated by reference to the FIGURE of the appended drawing which is a simplified flow scheme of a refinery unit suitable for use in practicing the invention.

In the drawing, a hydrocarbon feed stream (for example, a hydrofined cracking naphtha boiling between 240° and 455° F., containing a total of 2.8 p.p.m. nitrogen and having an octane rating of 58, F–1 clear) is supplied to the unit through line 10, along with a hydrogen-rich gas stream as supplied through line 11, the latter stream (which includes both make-up hydrogen as well as recycle hydrogen from line 18) conveniently being supplied in an amount of approximately 6000 s.c.f. per barrel of reactor feed, said feed including fresh feed to line 10 as well as recycle feed from line 28, as hereinafter described. The resulting mixture is then heated to approximately reaction temperature by heat exchanger 12, after which it is passed through a body of catalyst in isomerization-cracking zone 13, representative reaction conditions being from about 700° to 750° F., 1200 p.s.i.g. and a liquid hourly space velocity (LHSV) of 2. The catalyst in zone 13 can be, for example, molybdenum oxide (1% by weight Mo) deposited on a synthetic silica-alumina gel cracking support or one wherein both cobalt oxide (2.3% Co) and molybdenum oxide (7.3% Mo) are supported by said support, or one wherein 1 to 15% by weight nickel sulfide is supported on said support.

The effluent stream from zone 13 is passed through line 14 where it is mixed with water, from line 15, in an amount sufficient to extract the ammonia or equivalent nitrogen-containing compounds present, good results being obtained with approximately 10 lbs. of water per barrel of said effluent in the case of the naphtha feed mentioned above. The resulting water-hydrocarbon mixture is then passed through cooler 16 and into a high pressure gas-liquid separator 17 from which a hydrogen-rich recycle stream (containing approximately 90% or more of hydrogen, and substantially free of ammonia) is taken overhead through line 18 and recycled to zone 13. An aqueous phase is withdrawn from separator 17 through line 20 and discarded as waste, while a liquid hydrocarbon phase is recovered through line 21 and passed into a gas-liquid separator 22 operated at essentially atmospheric pressure. From the latter separator a gaseous stream, largely made up of $C_4$ and lower boiling components, is taken overhead and out of the system through line 23, while the heavy, normally liquid residue is fed through line 24 to a fractionating zone 25. In the latter zone the stream is separated into the desired gasoline fraction, or fractions, while the heavier portions are recycled back to the isomerization-cracking zone 13. In the diagram, a relatively light gasoline (e.g., largely $C_5$–165° F. fraction) is indicated as being taken overhead through line 26, while an intermediate gasoline fraction (e.g., a 165° to 350° F. cut) is taken through line 27. The portion of the feed to zone 25 boiling above the end point of the gasoline in line 27 is continuously recycled to zone 13 through line 28. By operating in this fashion, it is readily possible to obtain in good yield a gasoline product of high octane rating. For example, in the case of the naphtha feed described above, it is calculated that yields of $C_5$ to 350° F. gasoline obtained will approach 100 or more volume percent, based on fresh feed to line 10, and that octane rating of said gasoline will range from about 86 to 90, F–1 clear, depending on the nature of the fresh feed employed, the catalyst, and the severity of the reaction conditions in zone 13.

The present invention will be more particularly understood by reference to the following examples:

*Example I*

In this operation there is employed as feed stock a light catalytic cycle oil of California origin having the following specifications:

| | |
|---|---|
| Gravity, ° API | 28.6 |
| Aniline point, ° F. | 102 |
| Nitrogen, p.p.m. | 600 |
| Sulfur, weight percent | 0.74 |
| Boiling range, ASTM D–158: | |
| Start | ° F. 429 |
| 10% | ° F. 457 |
| 50% | ° F. 481 |
| 90% | ° F. 515 |
| End point | ° F. 541 |

In order to reduce the nitrogen content of this feed to a satisfactory level, the feed is subjected to a hydrofining operation wherein the stock is passed at a temperature of 770° F. and a pressure of 800 p.s.i.g., along with 3000 to 6000 s.c.f. of hydrogen per barrel of feed, through a catalyst containing molybdenum oxide (9% Mo) and cobalt oxide (2% Co) deposited on alumina. The resulting material is fractionated so as to strip off the hydrogen sulfide and ammonia gases, leaving a product having the following specifications:

| | |
|---|---|
| Gravity, ° API | 31.2 |
| Aniline point, ° F. | 104.0 |
| Nitrogen, p.p.m. | 73 |
| Sulfur, weight percent | 0.01 |
| Boiling range, ASTM D–158: | |
| Start | ° F. 356 |
| 10% | ° F. 435 |
| 50% | ° F. 474 |
| 90% | ° F. 512 |
| End point | ° F. 544 |

The above stock is processed in accordance with the same general flow scheme as described above in connection with the drawing, except that here the steps of water introduction through line 15 and withdrawal of an aqueous waste product through line 20 are omitted. Instead, removal of ammonia from the hydrogen-rich gaseous recycle stream in line 18 is effected by passing said stream through a bed comprising $H_3PO_4$ absorbed on kieselguhr. The processing is continued by passing the above feed stock (containing 73 p.p.m. nitrogen), along with 7000 s.c.f. of hydrogen per barrel of feed, through the isomerization-cracking zone 13 at a temperature of 775° F., a pressure of 1200 p.s.i.g. and an LHSV of 2. In this operation, the catalyst employed in zone 13 is made up of 0.3% platinum deposited on silica alumina, said catalyst having an on-stream age of 88 hours at the beginning of the run (when ammonia removal was instituted) and of 176 hours at the end of the run, when said removal step was again omitted. Processing continued over this period, with the portion of the effluent from isomerization-cracking zone 13 boiling above 390° F. being recycled to said zone, and with periodic inspections being made as to the amount and quality of the $C_5$ to 390° F. gasoline recovered from the effluent from said zone. During a representative portion of this run (i.e., the period from 130 to 170 hours), the per-pass conversion averaged approximately 44%. Analysis of the composited $C_5$ to 390° F. gasoline fraction obtained over this 40-hour period disclosed that said gasoline was obtained in a yield of 100.2 volume percent, based on fresh feed to zone 13, and said gasoline had an octane rating of 85.6, F-1 clear, and of 96, F-1 plus 3 ml. TEL. Of said fresh feed, 15.4 weight percent was converted to $C_4^-$ products, it being estimated that the loss to such product could have been reduced by approximately 20 to 25% by operating at 700° F. instead of 775° F., with a consequent increase in the amount of gasoline produced.

*Example II*

In the operation described above in Example I, the catalyst is sufficiently active as to give a per-pass conversion of approximately 42% at the end of 176 hours of continuous on-stream operation. It was found that this conversion rapidly dropped to 25% (at 190 hours) when the ammonia removal step was omitted (at 176 hours). Again, with reinstitution of the ammonia removal stream (at 210 hours), the activity was rapidly restored, the per-pass conversion reaching 38% at 220 hours.

We claim:

1. In an isomerization-cracking process wherein a nitrogen-containing petroleum distillate, containing less than 500 p.p.m. nitrogen and boiling below about 750° F., is converted to products including a gasoline having a relatively high octane rating and having a boiling range below the feed boiling range, by passage of fresh distillate, unconverted cycle stock, recycle gas, and a fresh gas containing at least 1500 s.c.f. of hydrogen per barrel of total feed into contact in an isomerization-cracking zone at temperatures above about 500° F., pressures of at least 600 p.s.i.g. and a space velocity of about 0.3 to 5.0 LHSV with a catalyst comprising at least one group VIII hydrogenating-dehydrogenating component associated with an active cracking support, the improvement which comprises minimizing catalyst deactivation, minimized methane production and increasing per-pass conversions by maintaining the reaction temperature in said isomerization-cracking zone below 750° F. during the major portion of the catalyst on-stream period including the initial portion of said period, recovering from the effluent from said zone an ammonia-free, hydrogen-rich gas stream, and recycling said gas stream to said zone.

2. A process as in claim 1, which is operated with a net consumption of hydrogen.

3. A process as in claim 1 wherein the nitrogen-containing petroleum distillate contains less than 200 p.p.m. nitrogen.

References Cited by the Examiner

UNITED STATES PATENTS

| | | | |
|---|---|---|---|
| 2,393,288 | 1/46 | Byrns | 208—46 |
| 2,419,029 | 4/47 | Oberfell | 218—57 |
| 2,459,465 | 1/49 | Smith | 208—57 |
| 2,723,946 | 11/55 | Donaldson | 208—79 |
| 2,758,064 | 8/56 | Haensel | 208—60 |
| 2,799,626 | 7/57 | Johnson et al. | 208—166 |
| 2,911,356 | 11/59 | Hanson | 208—110 |
| 3,127,339 | 3/64 | Scott | 208—111 |

ALPHONSO D. SULLIVAN, *Primary Examiner.*

UNITED STATES PATENT OFFICE
CERTIFICATE OF CORRECTION

Patent No. 3,157,590                  November 17, 1964

John W. Scott, Jr., et al.

It is hereby certified that error appears in the above numbered patent requiring correction and that the said Letters Patent should read as corrected below.

Column 1, line 18, after "our" insert -- prior --; column 3, line 49, after "material" insert -- present --; column 5, line 47, for "cracking" read -- cracked --; column 8, line 18, for "minimized" read -- minimizing --.

Signed and sealed this 6th day of April 1965.

(SEAL)
Attest:

ERNEST W. SWIDER
Attesting Officer

EDWARD J. BRENNER
Commissioner of Patents